(12) United States Patent
Yoshida et al.

(10) Patent No.: US 6,534,883 B2
(45) Date of Patent: *Mar. 18, 2003

(54) POWER SUPPLYING APPARATUS FOR A VEHICLE AND AN INTENSIVE WIRING APPARATUS

(75) Inventors: Tatsuya Yoshida, Urizura-machi (JP); Hiroyuki Saito, Hitachinaka (JP); Shinichi Sakamoto, Mito (JP); Mitsuru Koni, Hitachinaka (JP); Kiyoshi Horibe, Hitachi (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/930,257

(22) Filed: Aug. 16, 2001

(65) Prior Publication Data

US 2001/0054847 A1 Dec. 27, 2001

Related U.S. Application Data

(60) Continuation of application No. 09/311,595, filed on May 14, 1999, now Pat. No. 6,307,279, which is a division of application No. 08/876,027, filed on Jun. 13, 1997, now Pat. No. 5,990,570.

(30) Foreign Application Priority Data

Jun. 13, 1996  (JP) ............................................. 8-152296

(51) Int. Cl.⁷ ................................................ H02H 5/04
(52) U.S. Cl. ...................... 307/10.1; 307/117; 257/467; 257/470; 327/512; 361/106
(58) Field of Search ................ 307/10.1, 117; 257/467, 470; 361/106; 327/512

(56) References Cited

U.S. PATENT DOCUMENTS

| | | | |
|---|---|---|---|
| 4,224,537 A | * 9/1980 | Glazer | ......................... 327/512 |
| 4,771,382 A | 9/1988 | Shiono et al. | |
| 4,855,896 A | 8/1989 | Oho et al. | |
| 5,066,919 A | * 11/1991 | Klassen et al. | ............. 324/503 |
| 5,113,410 A | 5/1992 | Hamano et al. | |
| 5,268,644 A | * 12/1993 | Klassen et al. | ............. 324/503 |
| 5,414,416 A | * 5/1995 | Yamakita et al. | ........... 361/103 |
| 5,438,506 A | 8/1995 | Oho et al. | |
| 5,587,863 A | * 12/1996 | Bergström et al. | .......... 361/103 |
| 5,726,481 A | * 3/1998 | Moody | ....................... 257/467 |
| 5,818,673 A | * 10/1998 | Matsumaru et al. | ....... 307/10.1 |
| 6,307,279 B1 | * 10/2001 | Yoshida et al. | ............ 307/10.1 |

\* cited by examiner

Primary Examiner—Albert W. Paladini
(74) Attorney, Agent, or Firm—Crowell & Moring LLP

(57) ABSTRACT

The electric power breaker for breaking the electric power is placed on the midpoint of the electric power line from the battery power supply, and the electric power line is extracted from the electric power breaker. In addition, the electric power supply terminal is placed on the midpoint on the electric power line, from which the electric power is supplied to the individual electric load. The electric power distribution and the electric power supply operation to the electric loads are controlled by the multiplex communication. A semiconductor device having a self protection function is used as the switching device for supplying the electric power. The electric power line covered by the electric conductive material is arranged in a loop topology so as to start from the connection point to the battery and pass through the designated positions in the vehicle and return to the battery. On the designated points on this loop, plural control modules are connected, and the electric power is supplied to them from the battery. By isolating plural electric conductive parts of the electric conductive layer covering the electric power line, each part connected to the abnormality detection circuit of the individual control module, and by detecting the electric potential change in the individual electric conductive part, the position of the abnormality can be identified by the position of the isolated electric conductive part where the short circuit abnormality is detected.

2 Claims, 17 Drawing Sheets

| SWITCH | OFF | ACC | RUN | START |
|--------|-----|-----|-----|-------|
| A | OFF | OFF | OFF | ON |
| B | OFF | OFF | ON | ON |
| C | OFF | ON | ON | ON |

POWER SUPPLYING APPARATUS FOR A VEHICLE AND AN INTENSIVE WIRING APPARATUS

This application is a continuation of application Ser. No. 09/311,595, filed May 14, 1999, now U.S. Pat. No. 6,307,279 which is a division of application Ser. No. 08/876,027, filed Jun. 13, 1997 now U.S. Pat. No. 5,990,570.

BACKGROUND OF THE INVENTION

The present invention relates to an electric system for vehicles, an electric system having plural electric loads for supplying electric power commonly to the plural electric loads, specifically to an electric power supplying apparatus, and intensive wiring apparatus for automotive vehicles.

As various kinds of electric equipment are usually used for riding vehicles, many system of electric power lines are used, for example, for supplying the electric power from the electric power apparatus such as batteries and electric power generator to the electric load.

In recent years, especially for automotive vehicles, many kinds of electric equipment are loaded and their numbers increases remarkably. As a result, there may be an unfavorable case in which an increase in the number of equipment wires in the vehicle gives some constraint problems in applying this kind system to the practical use.

For resolving this problem accompanied with the increase in the number of equipment systems, what is often used is a so-called "line concentration and wiring system" which is a controller having a communication function and an arithmetic function for controlling the individual electric load, in which the control signal for the individual electric load is obtained by numerical calculation and the control signal so calculated is transferred to the terminal apparatus connected to the controller through the communication lines, and thus, some electric loads connected to the terminal apparatus may be controlled.

With this controller, the number of lines required for transmitting the control signals can be reduced and resolve the problems accompanied with the increase in the number of equipment systems.

As for this kind of line concentration and wiring systems, for example, some systems in the prior art are disclosed in U.S. Pat. Nos. 4,771,82, 5,113,410, 4,855,896 and 5,438,506.

However, even in case of applying this kind of line concentration and wiring systems in the prior art, as the electric power to the individual electric load is supplied directly from the electric power line through the fusing fuse, the number of electric power lines is required so to be equal or larger than the number of electric loads. Therefore, in the prior art systems, the individual parts in the vehicle such as the ceiling and floor of the cabin are usually filled with many electric power lines.

In the conventional electric power supply system for the vehicles, what is generally used is a single-sided-earth electric power supply method, in which the electric power supply lines from the electric power supply assume that one part of the vehicle body is used as one side of the electric power supply line. Therefore, in case that any of electric power supply lines accidentally contacts the vehicle body, a short-circuit abnormality occurs.

In order to solve this short-circuit abnormality, in the prior art electric power supply systems for the vehicles, an independent fuse is installed for the individual electric load system, with which a designated electric load system may be protected by making the fuse melted when the electric power line gives a short-circuit and by separating the electric load system from the electric power supply.

In the prior art systems, when the fuse is melted in accordance with the electric circuit abnormality and then, the operation of the corresponding electric load is interrupted, there may be caused such a problem that the safety feature of the whole vehicle system and the comfort feature in driving the vehicle may be partially disabled or fully lost.

SUMMARY OF THE INVENTION

An object of the present invention is to provide a new electric power supply system for the vehicles, more specifically to reduce the number of electric power supply lines from the electric power supplying apparatus in the vehicle. An object of another invention is to eliminate the fuse, and an object of yet another invention is to provide a new electric power supply method.

Another object of the present invention is to provide a new semiconductor circuit apparatus for supplying the electric power.

A further object of the present invention is to provide a new line intensive wiring apparatus integrated with the electric power supply control system. And furthermore, an object of another invention is to provide a new electric power supplying apparatus for supplying the electric power to the specified electric load in the automotive vehicle.

In order to achieve the above described objects, the following apparatus configuration and its operation method is proposed; a control apparatus for controlling the individual electric equipment or an electric power supply terminal for supplying intensively electric power is located near the position where the electric equipment are concentrated, and the wiring harness to the electric equipment and the control apparatus is limited to the minimum and necessary scale, in order to reduce the number of electric lines for supplying the electric power. In addition, the output circuit itself is made to have the functions as a relay and/or a fuse by driving and controlling the load with the semiconductor switching devices including a protection function, and thus, making the system free from maintenance works, the protection relay and the fuse existing conventionally are partly removed.

And furthermore, by means that distributing and transmitting the electric signal representing the status of the ignition key (engine key) switch as communication data through multiplex communication, the electric power lines related to the ignition key are eliminated.

In the present invention, in the electric power supplying apparatus for the vehicle using the single-sided earth load dispatching method in which the electric power supply from the electric power source to the electric load is performed by supplying the electric power through the electric conductive route defined in the body of the vehicle and through the control unit to which the electric power is supplied by the electric power supply, there are the electric power supply line for supplying the electric power to the control unit, which is formed as a closed loop starting at one of the output ports of the electric power supply and terminated at the other of the output ports of the electric power supply, and is arranged inside the body of the vehicle; the electric conductive body which covers the outer surface of the electric power line and is separated by the individual point at which the control unit of the electric power line connects, and is formed as an independent part along the closed loop; the insulation layer covering the outer surface of the electric conductive body; and a plurality of electric potential detection means for detecting the abnormality of the electric potential change in the electric conductive body, each connected to the individual electric conductive bodies, with which the position of the abnormality is identified by judging which electric potential detection means has abnormality when the abnormality occurs.

And furthermore, in the electric power supplying apparatus for the vehicle using the single-sided earth load dispatching method in which the electric power supply from the electric power source to the electric load is performed by supplying the electric power through the electric conductive route defined in the body of the vehicle and through the control unit to which the electric power is supplied by the electric power supply, and for performing the data transmission between the individual control units through the transmission lines mounted inside the vehicle body, there are the electric power supply line for supplying the electric power to the control unit, which is formed as a closed loop starting at one of the output ports of the electric power supply and terminated at the other of the output ports of the electric power supply, and is arranged inside the body of the vehicle; the electric conductive body which covers the outer surface of the electric power line and is separated by the individual point at which the control unit of the electric power line connects, and is formed as an independent part along the closed loop; the insulation layer covering the outer surface of the electric conductive body; and a plurality of electric potential detection means for detecting the abnormality of the electric potential change in the electric conductive body, each connected to the individual electric conductive bodies, with which the position of the abnormality is identified by judging which electric potential detection means has abnormality when the abnormality occurs, and the abnormality detection result is transmitted to another control unit.

PREFERRED EMBODIMENT OF THE INVENTION

Figure 1:
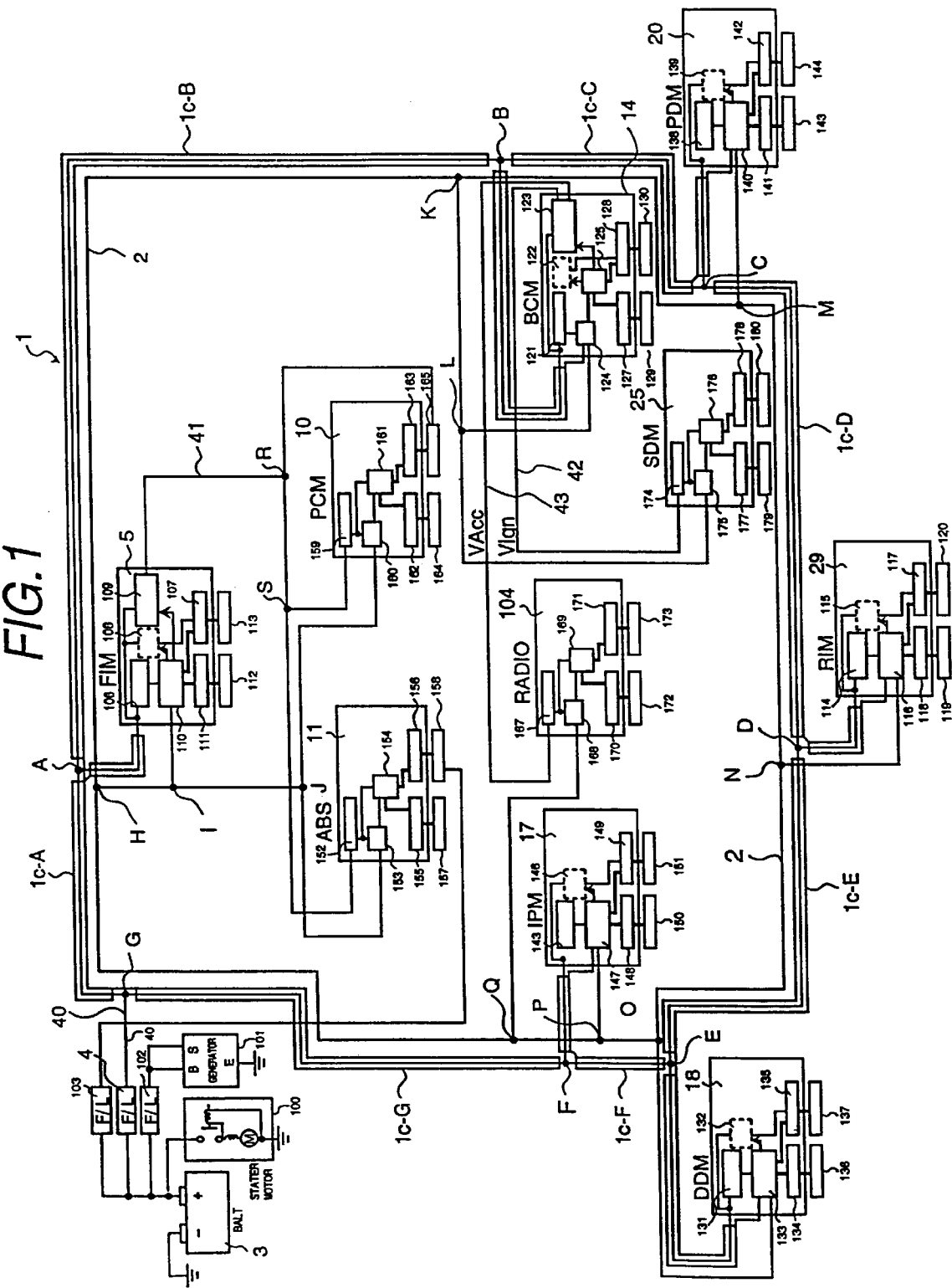
FIG. 1 is an overall configuration of one embodiment of the electric power supplying apparatus and intensive wiring apparatus for a vehicle according to the present invention.
Figure 2:
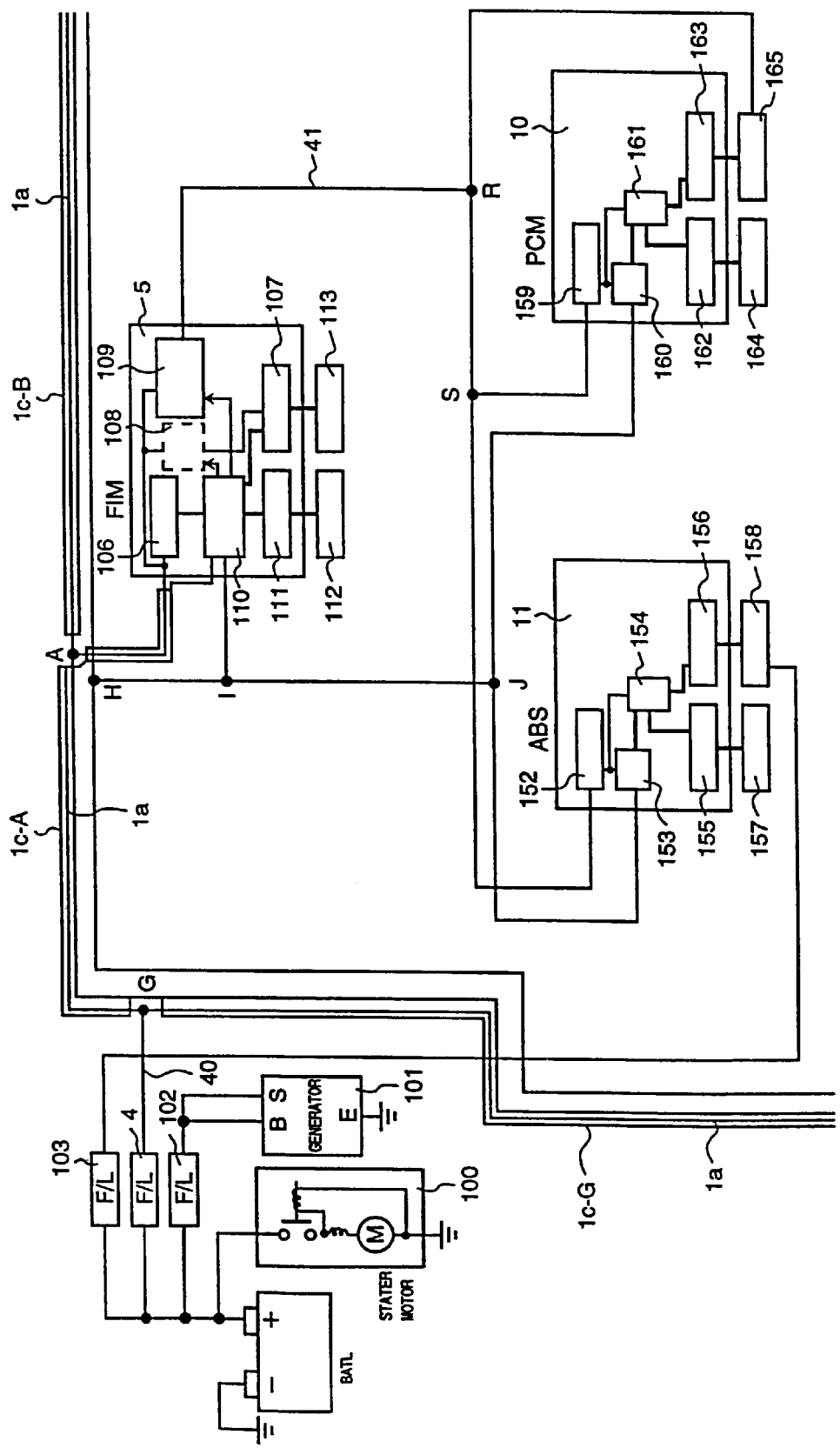
FIG. 2 is a magnified view of the upper left part of the block diagram of one embodiment of the present invention.
Figure 3:
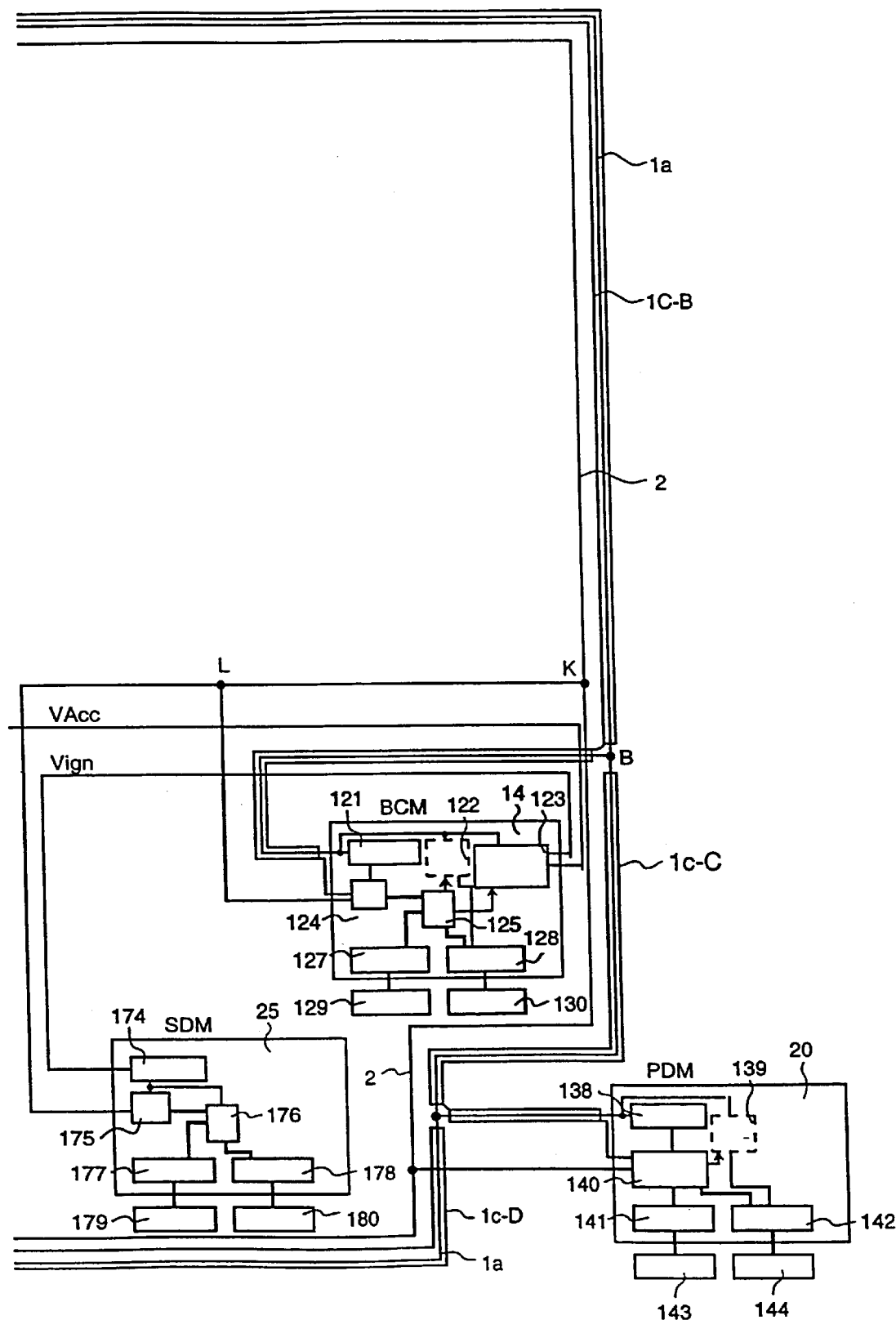
FIG. 3 is a magnified view of the right part of the block diagram of one embodiment of the present invention.
Figure 4:
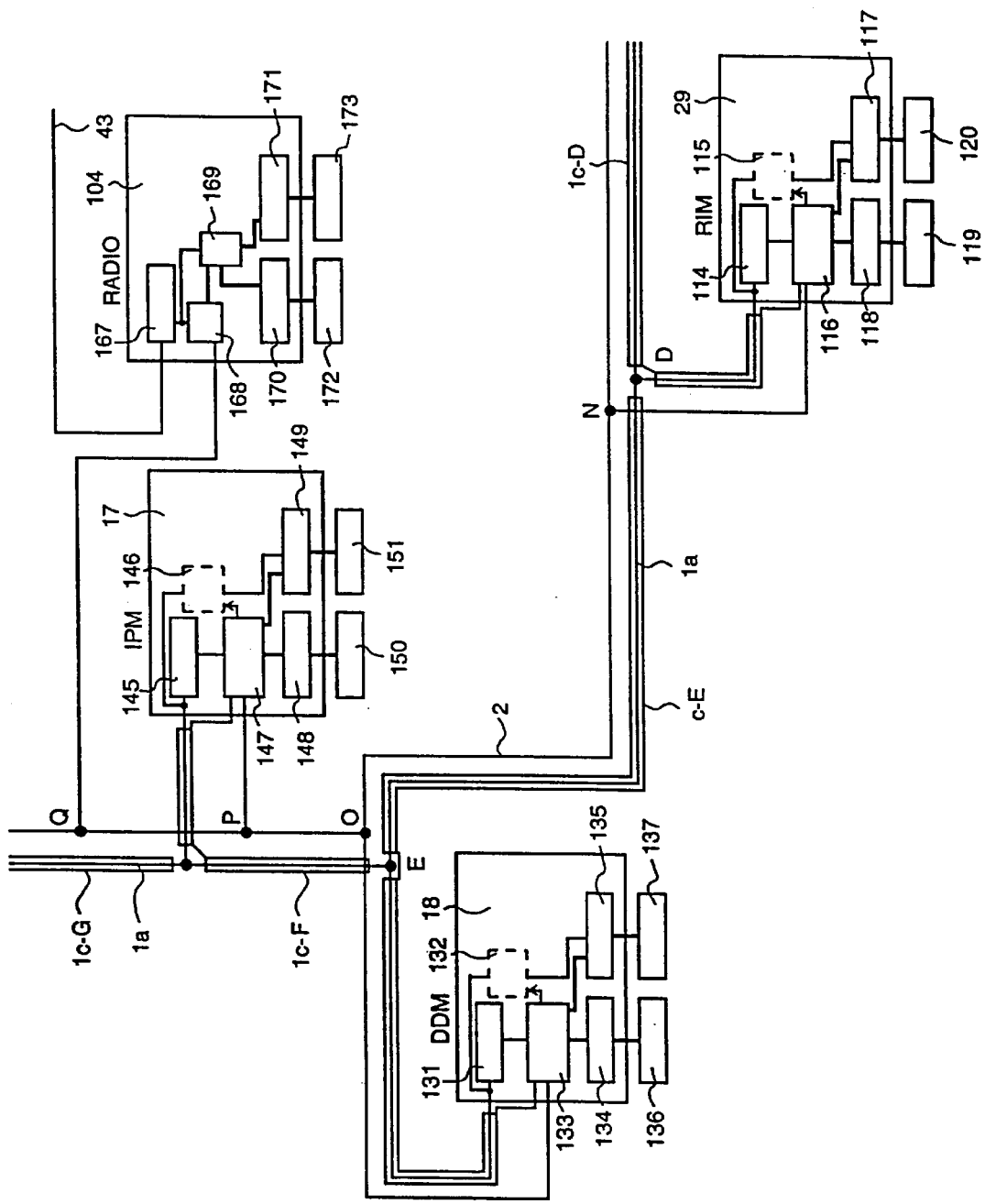
FIG. 4 is a magnified view of the lower left part of the block diagram of one embodiment of the present invention.

FIG. 1 is a block diagram of one embodiment of the electric power supplying apparatus and intensive wiring apparatus for vehicles according to the present invention; and FIGS. 2 to 4 are block diagrams in which designated parts of the apparatus are shown in a magnified view. As found in those figures, the automobile realized with this embodiment has a battery 3 as an electric power supply, and a dynamo 101 driven by the engine.

In the battery 3, the minus-side terminal (the other terminal) is made to be connected to the body of the automobile. With this structure, that is, single-sided earth electric power supply method, the electric power is supplied to the individual electric loads in the automobile, and the plus-side terminal (one terminal) is connected to the wire 40 through the fusible link 4, from which the electric power is supplied to the individual electric loads.

The electric power generator 101 is connected to the plus-side terminal of the battery 3 through the fusible link 102, with which the battery 3 is charged up.

In addition, the starter motor 100 is directly connected to the plus-side terminal of the battery 3, and similarly, the electric power is supplied directly to the motor (described later) for ABS (Anti Lock Brake System), in which large amount of current is applied, through the fusible link 103.

The component 5 is FIM (Front Integrated Module) is located in the front side of the engine room and neighboring to the head lamps and the turn signal lamps, and is connected to the head lamps, the turn signal lamps and the hones mounted around them so as to drive those equipment.

The component 10 is PCM (Power Train Control Module) for controlling the fuel oil consumption and the ignition timing as well as the operation of the transmission, and is located near the engine in which many sensors and actuators to be controlled and used for engine control operation are mounted.

Various kind of sensors such as air flow meter and water temperature sensor, and various kind of actuators such as injectors and cooling fan motors are connected to PCM 10.

The component 11 is ABS control Module, and is mounted next to the ABS actuator in the back-side of the engine room. The electric power is supplied directly to the actuator 158 of the ABS control module 11 independently through the fusible link 103 from the battery 3.

The component 14 is BCM (Body Control Module) is located near the dash because BCM is connected to the devices and the key switch around the steering.

The component 17 is IPM (Instrument Panel Module) mounted inside the instrument panel meter, and used for driving the lamps and meters in the instrument panels.

The component 18 is DDM (Driver Door Module) mounted in the driver's seat side door, and the component 10 is DDM mounted in the navigator's seat side door, to which the door lock motor, the power window motor, the door lock switch and the power window switch are connected.

The component 25 is SDM (Air Back Control Module) mounted near the center console.

The component 29 is RIM (Rear Integrated Module) located in the front side of the trunk room neighboring to the tail lamps and the turn signal lamps, and is connected to the tail lamps and the turn signal lamps and the door lock motor and the power window motors in the rear doors.

As described above, the individual module is so located near the device to which the corresponding module is connected, as to make the length of the harness linking between the modules and the devices shorter.

The individual modules, FIM 5, IPM 17, DDM 18, PDM 20 and RIM 29 have a communication means for exchanging the data with another module, and an interface to the I/O devices connected to the modules. However, in this embodiment, arithmetic processor apparatus (CPU) is not used.

However, it is of course allowed to install CPU as a modification embodiment of the present invention.

Next, the configuration of the electric power supply system for the individual module is described.

In FIGS. 1 to 5, the component 1 is an electric power cable. As shown in FIG. 6, the electric power cable 1 has the electric power line 1a at its axial center, and comprises the insulation material 1b covering co-axially the electric power line 1a, the electric conducive body 1c covering co-axially the insulation material 1b and the insulation material 1d covering co-axially the electric conductive material 1c.

The electric power line 1a is generally made of single copper wire or twisted copper wire, and is used for the electric conductive line for supplying the electric power.

The insulation material 1b is composed of rubber and plastic used for insulating the electric power line 1a.

The electric conductive body 1c is made from fine copper mesh formed in the co-axial layer around the insulation material 1b, and is used for a short sensor.

In addition, the insulation material 1d is made of rubber and plastics and used as a protection layer for the cable.

The electric power cable 1 is so laid out as that as shown in FIGS. 1 to 5, the closed loop may pass through the neighboring areas of the designated modules mounted inside the body of the automobile, that is, the modules FIM5, BCM14, PDM 20, RIM 29, DDM 18 and IPM 17 in clockwise on the loop shown.

In addition, the electric conductive body 1c of the electric power cable 1 is separated into sub parts along the loop at the separated points A to G neighboring to the individual modules FIM5, BCM14, PDM 20, RIM 29, DDM 18 and IPM 17. The sub parts include the individual electric conductive parts, 1c-A, 1c-B, 1c-C, 1c-D, 1c-E, 1c-F and 1c-G in the clockwise as shown in the figure.

At first, the line 40 extracted through the feasible link 4 from the plus-side terminal of the battery 3 is connected to the electric power line 1a of the electric power cable 1 at the point G, and thus, the plus-side terminal of the battery 3 is connected to the electric power line 1a.

Next, the electric power line 1a branches individually at the points A to F, and connects to the individual inputs to the electric power supply terminals for the modules FIM5, BCM14, PDM 20, RIM 29, DDM 18 and IPM 17.

With this configuration, the electric power is supplied directly from the electric power line 1a to the individual modules.

As for the modules to which the electric power supply is not always required to be supplied but is allowed to be supplied conditionally, for example, only if the ignition key switch is turned on, the modules connected to the electric power line 1a in the above mentioned manner supplies the electric power auxially.

For example, the electric power is supplied from FIM 5 through the line 41 to the modules and actuators such as PCM 10 and ABS 11 mounted inside the engine room. Similarly, the electric power is supplied from BCM 10 through the lines 42 and 43 to the actuators and sensors such as RADIO (audio devices) 104 and SDM 25 mounted inside the cabin.

Thus, the electric power cable 1 is arranged in a loop topology inside the automobile, and the modules to which the electric power is supplied directly from the electric power line 1a arranged in a loop topology, and the control modules from which the electric power is supplied to the modules, actuators and sensors such as FIM 5 and BCM 14, are arranged inside the engine room, the cabin and the trunk room. With this layout configuration in this embodiment, it can be avoided to use such a layout configuration that many electric power lines are arranged redundantly in parallel, and hence, the number of wire harness inside the automobile can be reduced as less as possible.

In turn, using the above described layout configuration, when the electric power line is accidentally made short to the vehicle body, the whole electric power supply to all the modules is shut down, which leads to the failure of almost all functions of the vehicle.

In order to resolve this problem, in this embodiment, necessary operations for detecting the occurrence of any short circuit and preventing the functional failure in the automobile when there seems a possibility to arise any short circuit in the electric power line.

In this embodiment, as shown in FIG. 6, the electric conductive body 1c is equipped in the electric power cable arranged in a loop topology, and used as a short sensor for detecting the short circuit abnormality as described later.

The electric conductive body 1c of the electric power cable 1 is separated into sub parts along the loop at the separated points A to G, each point connected to the individual modules, and the individual electric conductive body parts, 1c-A, 1c-B, 1c-C, 1c-D, 1c-E, 1c-F and 1c-G are defined on the closed loop in the clockwise as shown in the figure and are used as short sensors, respectively. The electric conductive body parts 1c-A to 1c-G branch at the point where the electric power line 1c branches, and they connect to the individual modules.

The individual module connected to the electric power line 1a has a circuit for detecting the abnormality of the individual short sensor, with which the abnormality of the individual short sensor can be detected.

The one terminal of the electric conductive body part 1c-A ranches at the point A and connect to the short sensor abnormality detection circuit and the I/O communication IC (designated "abnormality detection circuit" ) 110 of FIM 5; and another terminal of the electric conductive body part 1c-A connects to the one terminal of the electric conductive part 1c-G at the point G, and another terminal of the electric conductive body part 1c-G opens at the point F.

Therefore, the abnormality detection circuit 110 of FIM 5 operates as a short sensor defined as a electric conductive body part between the point A and the point F.

The abnormality detection circuit 124 of BCM 14 is connected to the electric conductive body part 1c-B defined between the point B and the point A, and is used as a short sensor. Similarly, the abnormality detection circuit 140 of PDM 20 is connected to the electric conducive body part 1c-C defined between the point C and the point B, the abnormality detection circuit 116 of RIM 29 is connected to the electric conductive body part 1c-D defined between the point D and the point C, the abnormality detection circuit 133 of DDM 18 is connected to the electric conductive body part 1c-E defined between the point E and the point D, and the abnormality detection circuit 147 of IPM 17 is connected to the electric conductive body part 1c-F defined between the point F and the point E, in which the individual electric conductive body part 1c are used as short sensors.

Next, referring to FIG. 6, the individual abnormality detection circuits 110, 124, 140, 116, 133 and 147 are described with the representative example of the abnormality detection circuit 110 of FIM 5.

Though the each abnormality detection circuit contained in the individual module includes an I/O communication IC, the I/O communication IC is not shown in the figure.

As shown in FIG. 6, the abnormality detection circuit 110 comprises a constant voltage power supply 110a, the short sensor abnormality judgment circuit 110b, resistance 110c, 110d and 110e, and is connected to the electric power line 1a and the electric conductive body 1c of the electric power cable 1 through the connector terminals X, Y and Z.

The constant voltage power supply 110a gets the battery voltage from the electric power line 1a, and generates a designated constant value of voltage Vcc, for example, 5 V.

The short sensor abnormality judgment circuit 111b is composed of a voltage comparator circuit for comparing the voltage Vx to be supplied through the resistance 110e with the designated reference voltage Vs (Vs=Vcc/2), which judges the level of the input voltage Vx with the reference voltage Vs as a threshold value; if the input voltage Vx is less than the reference voltage Vs, that is, Vx<Vs, the occurrence of the abnormality is reported, and then a designated abnormality signal is generated.

The resistance 110c and the resistance 110d form a voltage separation circuit, which divides the voltage Vcc put out from the constant voltage power supply 110a into the half of Vcc, and supplies the divided voltage Vx to the connector terminal X.

The voltage division ratio is defined by setting the resistance 110c and 110d so that the relation Vx≧Vs may be satisfied.

The resistance 110e is used for circuit protection.

Next, the operation of the abnormality detection circuit 110 is described.

The electric conductive body 1c of the electric power cable 1 is separated from the electric power line 1a by the insulation material 1b, and is shielded by the insulation material 1d. Therefore, the electric conductive body 1c is usually insulated from the body of the vehicle when installed inside the body of the vehicle.

In usual operation condition, the electric current flowing into the electric conductive body 1c does not occur in spite that the voltage Vx is applied to the connector X, and as a result, the voltage of the electric conductive body 1c in relative to the earth (the body of the vehicle), that is, the electric potential of the electric conductive body 1c is maintained to be the voltage Vx at the connector terminal X and hence, the relation Vx≧Vs is satisfied. Therefore, the short sensor abnormality judgment circuit 110b does not generate the abnormality signal.

However, when the electric conductivity occurs accidentally between the electric conductive body 1c and the earth due to some reason, the electric current occurs flowing from the connector terminal X to the electric conductive body 1c. As a result, the voltage drop in the resistance 110c increases, the voltage at the connector terminal X decreases below Vx.

As a result, the relation Vx≧Vs is not satisfied any more but the relation Vx<Vs makes effective, and the abnormality signal is generated by the short sensor abnormality judgment circuit 110b and the occurrence of the abnormality is reported.

Figure 5:
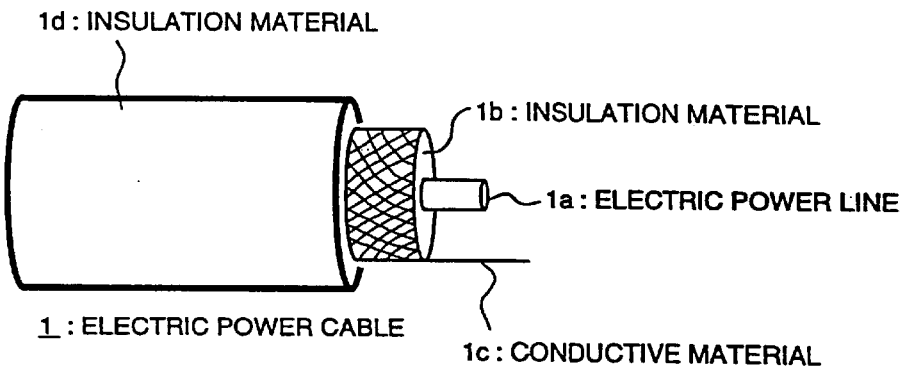
FIG. 5 is a description picture of the electric power cable used in one embodiment of the present invention.
Figure 6:
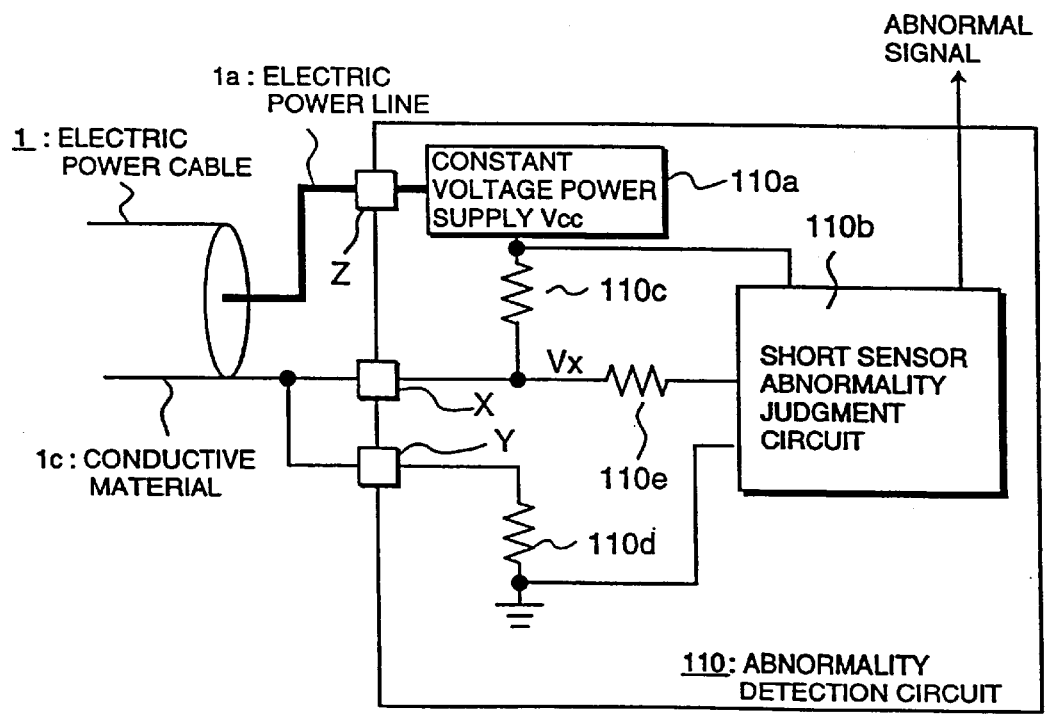
FIG. 6 is a block diagram of the abnormality detection circuit in one embodiment of the present invention.

As found explicitly in FIG. 5, the electric conductive body 1c of the electric power cable 1 is separated from the electric power line 1a by the insulation material 1b, and covers around the insulation material 1b. As the outer surface of the electric conductive body 1c is shielded by the insulation material 1d, when the electric power line 1a makes short to the earth, the insulation structure of the insulation material 1d in relative to the earth becomes broken down at first and the short between the electric conductive body 1c and the earth, and the emerged and precursor phenomena of electric conductivity between usually insulated material are necessitated.

In other words, as far as the insulation structure of the insulation material 1d in relative to the earth is not broken and the electric conductivity between them does not occur, there is no possibility that the electric power line 1a makes short to the earth.

Therefore, according to this embodiment, as the short abnormality is detected when the electric conductivity between the insulation material 1d of the electric power cable 1 and the earth is found, it will be appreciated that the possibility of the occurrence of the short abnormality in the electric power line 1a can give a good information to report the abnormality and that the short abnormality can be prevented eventually before hand in the electric power line 1a.

In this embodiment, at the part where the closed loop of the electric power line 1a is formed, the electric conductive body 1c in the electric power cable 1 are separated into the independent electric conductive parts 1c-A, 1c-B, 1c-C, 1c-D, 1c-E, 1c-F and 1c-G, corresponding to each of the abnormality detection circuits 110 of the individual modules.

Therefore, according to this embodiment, which circuit among the abnormality detection circuits 110 for the individual modules detects the abnormality, the location of the abnormality occurrence on the closed loop can be identified accurately for the individual electric conductive parts 1c-A, 1c-B, 1c-C, 1c-D, 1c-E, 1c-F and 1c-G.

Thus, when the abnormality is detected and the abnormality occurrence position is identified, the data relevant to this abnormality information are stored in a designated memory, or transferred to another module or diagnostic tools through the communication lines if necessary. With this operation, the driver and the dealer can easily recognize the occurrence of the abnormality and identify the position of the abnormality.

Therefore, according to this embodiment, as the short sensor is made to be short to the ground and detects the short abnormality and then reports this phenomena to the diver before the symptom for the short between the electric power line and the ground may arise, the abnormality can be recognized before the overall functions of the automobile and hence, the abnormality can be resolved only by fixing the specified and localized abnormal part.

In this embodiment as shown in FIG. 6, the resistance 110d connected to the earth side used for the voltage division is not connected to the resistance 100c in the abnormality detection circuit 110, but its terminal is extracted out by the connector terminal Y and connected to the connection line of the electric conductive body 1c outside. With this circuit configuration, the electric current flowing from the constant voltage circuit 110a through the resistance 110c and 110d to the earth is forced to flow always in the contact part of the connector terminal X.

As known ever, the cable connector has a contact part composed of metallic contact points. Therefore, in case of using the cable connector, there may be danger that the contact function failure occurs due to the oxidization of the contact parts.

In this embodiment, as the electric current always flows thorough the connector, the oxidization of the contact point can be reduced enough. As a result, the functional failure of the abnormal detection circuit due to the contact point failure can be definitely prevented and thus, high reliability can be achieved.

Referring to FIGS. 1 to 4, the component 4 is a multiplex communication line, which is used for exchanging data among the modules. With this configuration, in this embodiment, the function as a intensive wiring apparatus can be obtained.

As shown in the figure, the multiplex communication line 2 is also arranged in a loop topology in the automobile.

The multiplex communication line 2 arranged in a loop topology branches at the position nearest to the individual module and extends and connects to the individual module.

For example, in this embodiment, FIM 5 connects at the point H on the communication line 2, BCM 14 connects at the point K on the communication line 2 and RIM 29 connects at the point N on the communication line 2, respectively.

Therefore, according to this embodiment, as the individual module is so located as to be closest to the device to be connected, and the input data and the output data of the device which is not connected directly to the individual module itself are transmitted and received through the multiplex communication line 2, there is no need to connect between the individual module and its target device located in distance through a separate line, and the amount of wire harness can be reduced further.

Next, the structure of the individual modules will be described.

FIM 5 is composed of the constant voltage power circuit 106 for supplying a constant voltage to the control circuit, the electric power supply circuit 108 for supplying the electric power to the external load drive circuit 107, the electric power supply circuit 109 for supplying the electric power to PM and ABS and the external loads, the short sensor abnormality detection circuit and I/O communication IC 110 described above, and the input circuit 111.

The constant voltage power circuit 106 and the electric power supply circuits 108 and 109 connect to the fusible link 4 through the electric power line 1a of the electric power cable formed in a loop topology, and finally connect to the plus-side terminal of the battery 3.

Next, the electric power supply circuit 108 controls the electric power supply to the external load drive circuit 107 in responsive to the data obtained by communication, as well as detects the electric current flowing into the electric power supply circuit 108 itself, and interrupts the electric power supply to itself when excess current arises.

Therefore, even if the short circuit arises in the external load and the drive circuit can not be isolated, it can be avoided that the excess current may continue to flow into the electric power supply circuit 108 by means of isolating the electric power supply circuit 108.

The electric power supply circuit 109 controls the electric power supply to the external modules PCM and ABS in responsive to the data obtained through the communication line 2, as well as it has a function to detect the electric current flowing into the electric power supply circuit 109 itself, and interrupts the electric power supply to itself when excess current arises.

Therefore, even if t the external may be damaged or fail to operate normally, it can be avoided that the excess current may continue to flow into the electric power supply circuit 109 by means of isolating the electric power supply circuit 109.

The short sensor abnormality detection circuit and I/O communication IC 110 are connected to the short sensor and the communication line, and detect the abnormality of the short sensor and exchange data with another module.

The electric power supply circuits 108 and 109 are turned ON and OFF in responsive to the data received by the I/O communication IC 110.

The external load drive circuit 107 is connected to the actuator 113 for the head lamp and the hone mounted near FIM 5, and drives the actuator 113 in responsive to the signal from the I/O communication IC 110.

The input circuit 111 transfers the signal 111 supplied to FIM to the I/O communication IC 110.

Similarly to FIM 5, RIM 29 is composed of the constant voltage power circuit 114, the electric power supply circuit 115, the short sensor abnormality detection circuit and I/O communication IC 116, the input circuit 118 and the external load drive circuit 117.

The external load drive circuit 117 is connected to the actuator 120 for the tail lamp, the trunk opener and the rear defogger mounted near RIM 29, and drives the actuator 120 in responsive to the signal supplied by the I/O communication IC 116. The input circuit 118 transfers the signal from the external load to the I/O communication IC 116.

BCM 14 is composed of the constant voltage power circuit 121, the electric power supply circuit 122, the electric power supply circuit 123, the short sensor abnormality detection circuit and I/O communication IC 124, CPU 125, the input circuit 127 and the external load drive circuit 128.

BCM 14 is mounted near the driver's seat dashboard, and its input circuit 127 is connected to the switches and sensors mounted around the drive's seat, for example, for switching the ignition key signal and so on, and its external load drive circuit 128 is connected to the actuator 130.

With this circuit configuration, BCM 14 manages intensively and controls the switching the electric power supply from the electric power supply circuits 108, 109 and 115 for FIM5 and RIM 29, and the input and output signals of FIM5, RIM 29, DDM 18, PDM 20 and IPM 17.

The electric power is supplied to the modules, for example, RADIO 104 and SDM 25, and their related sensors from the electric power supply circuit 123 in responsive to the operation status of the ignition key switch.

The short sensor abnormality detection circuit and I/O communication IC 124 exchanges data with another module.

And furthermore, CPU 125 captures the input data supplied directly to itself and the data received by another modules at the communication IC 124, and operates arithmetic procedures in responsive to the captured data, and outputs the drive signal for the actuator connected directly to itself in responsive to the arithmetic operation result, and finally, transmits the arithmetic operation result through the communication IC 124 to another module.

DDM 18 and PDM 20 are modules mounted inside the door, each composed of the constant voltage power circuits 131 and 138, the electric power supply circuits 132 and 139, the short sensor abnormality detection circuits and I/O communication IC's 133 and 140, and the input circuits 134 and 141, the external load drive circuits 135 and 142, respectively. Their functions are similar to those of FIM5 and RIM 29.

The input and output devices of DDM 18 and PDM 20 include the actuators 137 and 144 for the door lock motor and the power window (P/W) motor, and the switches 136 and 143 for the P/W switches and door lock switches.

IPM 17 is a module mounted inside the instrument panel meter, and has the exact same structure with DDM 18 and PDM 20. Its input and output signals include the output signal to the actuator 151 such as monitor and alarm lamps mounted inside the panel and the input signals from the switches in the panel and the sensor 150.

PCM 10, ABS 17, RADIO 104 and SDM 25 are composed of the electric power circuits 152, 159,167 and 174, the communication IC's 153, 60, 68 and 175, CPU's 154, 161, 169 and 176, the input circuits 155, 162, 170 and 177, and the external load drive circuits 156, 163, 171 and 178, respectively.

Those modules have CPU's, and operates arithmetic operations and communication control operations to their specified control devices. The electric power circuit 152, 159, 167 and 174 receive the electric power supplied by BCM 14, RIM 29 and FIM 5 and supply the electric power to the electric power supply of the individual module and to the actuators and the sensors. The communication IC's 153, 160, 168 and 175 are connected to the communication line 2 and exchange data with another module.

The external load drive circuit 156, 163, 171 and 178 are connected to the actuators 158, 165, 173 and 180 including the injector, the solenoid and the blower motor mounted at closer positions, and drives those actuators in responsive to the arithmetic operation results of their corresponding CPU's. The input circuits 155, 162, 170 and 177 transfers the input signals 157, 164, 172 and 179 to CPU's 154, 161, 169 and 176, respectively.

According to this embodiment, it will be appreciated that various kind of electric equipment can be controlled with the electric cables the number of which can be reduced so as to be far less than the genetic number of cables corresponding to the individual modules and actuators with high reliability and accuracy, and that the scale of the wire harness can be reduced easily even if the number of electric equipment increases.

According to this embodiment, as the potential of the occurrence of the short circuit abnormality at the specific position on the electric power line configured in a loop topology can be detected definitely, and its detection information can be reported to the driver, the reduction of the number of electric power cables is achieved. In addition, the abnormality of the vehicle can be recognized before the overall function of the electric loads operation, and the abnormality parts are so localized as to be easily fixed or exchanged.

According to this embodiment, the control of various kind of electric equipment can be done with less number of the electric cables than expected in a conventional method, and with higher reliability. Therefore, even if the number of electric equipment increases in the future implement or design, the scale of the wiring harness can be reduced reasonably.

Figure 7:
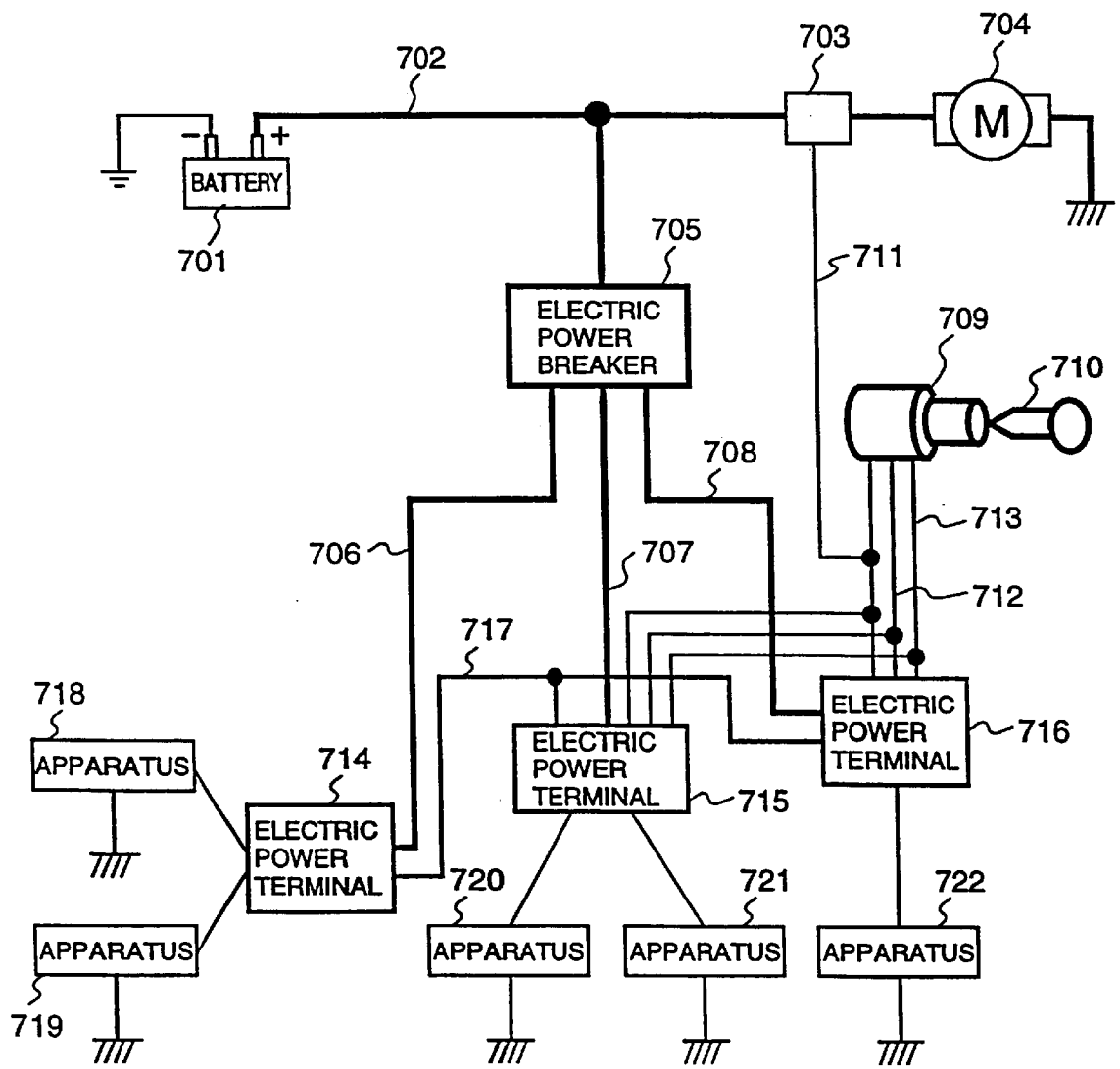
FIG. 7 is a system configuration diagram showing another embodiment of the present invention.

FIG. 7 is a system configuration diagram showing an overall system of another embodiment of the present invention. This system includes at large two electric power systems; a electric power supply system for supplying the electric power to the electric load apparatus, and a starter motor system used only when starting the engine of the automobile. The electric power supplied by the battery 70 is supplied through the main electric power cable 702 to the starter relay 703 and the electric power breaker 705. The starter relay 703 is a relay used for turning ON and OFF the electric current supplied to the starter motor 704 into which large amount of electric current is flowing. When the relay 703 is turned ON, the electric current is made to flow into the starter motor 704 and the engine is started.

The electric power supplied to the electric power breaker 705 is distributed through the breaker devices to the electric power cables 706 to 708, and connected to the electric power supply terminals 714, 715 and 716, respectively. In this embodiment, the electric power supply cables are configured in a star topology with the center node of the electric power breaker 5 and connected to the individual electric power supply terminals. It may be allowed to connect the electric power cables in a loop topology as shown in the previous embodiment and to connect them in a tree topology. It is also possible to combine a loop topology and a tree topology.

The equipment 718 to 722 to be connected to the individual electric power supply terminals are electric load apparatus operating with the electric power supplied by the electric power supply terminals. They may be motors and lamps, and some control apparatus mounted in the automobile. In general, those electric load apparatus are directly controlled by the ignition key switch with its operation defined at a specified switch position, or another switch, for example, ON-OFF switches of the head lamps.

The ignition key switch 709 is a switch operated by the engine key 710. In general case, the operation position of the ignition key switch determines the control mode for the selection of the electric power supply path and the ON-OFF operation of the electric power supply control. The signal carried on the electric power line from the switch is used as the electric power driving the individual electric loads located in the automobile and extends through the fuses to the designated positions.

The first object of the present invention is to reduce rationally the number of electric power lines extended in the automobile.

Figure 8:
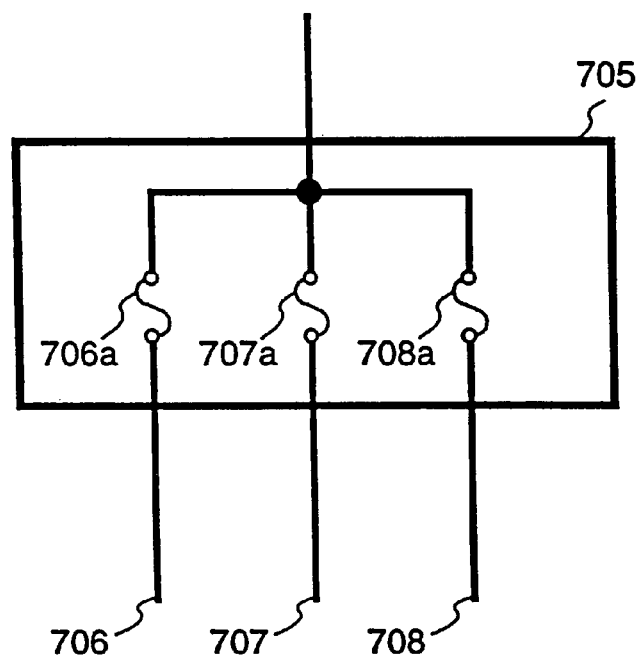
FIG. 8 is a structure diagram of the electric power breaker used in the embodiment.

FIG. 8 is an inner structure diagram of the electric power breaker 5. In this embodiment, what is used is a conventional mechanical fuse which is melted down and disconnected when the excess electric current flows in the fuse. In this embodiment, by means that fuses 706a, 707a and 708a are inserted in the individual electric power cables 706 to 708, it is aimed to establish the protection of related equipment and apparatus in the short circuit accident on the electric power cable extended to the electric power supply terminal and the duplex accident of the electric power supply terminals. Similarly to the previous embodiment, it is necessarily allowed to make the individual electric power supply lines have short sensors in stead of fuses.

Figure 9:
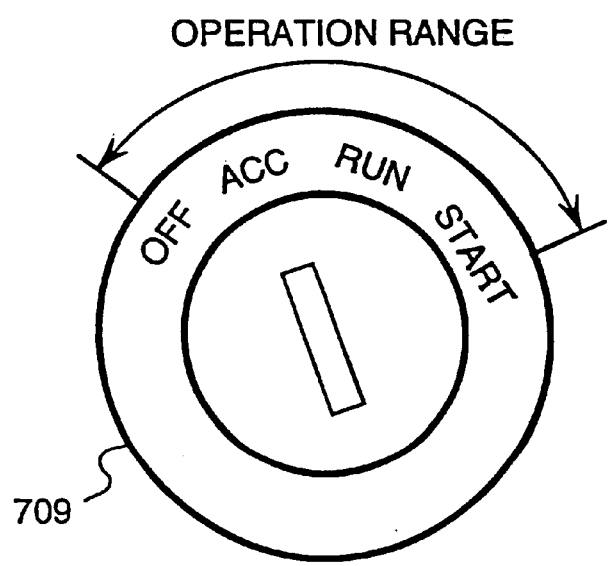
FIG. 9 is a description picture of the ignition switch used in the embodiment.

FIG. 9 is a front view of the key hole of the ignition key switch 709 to which the engine key 710 is to be inserted, in which the engine key 710 is inserted into the rectangular hole located in the center of the figure. The ignition key switch can be moved in a rotational direction at four predefined positions by the inserted engine key. Four positions are designated [OFF], [ACC], [RUN] and [START].

At the [OFF] position, the electric power supply to the electric loads other than the electric loads to which the electric power is supplied directly from the battery 701 is interrupted. The [ACC] position is defined for the operation of supplying the electric power to the accessory equipment connected to the automobile such as radio. At the [START] position, and the starter relay 702 which rotates the starter motor in order to start the engine is turned ON. In this embodiment, as the starter motor 704 is so configured as to be rotated normally even if the electric power supply control apparatus of the present invention is completely failed due to some trouble, for example, some unexpected accident happens while the automobile tries to pass through the railroad crossing, the automobile is so constructed as to be moved.

Figures 10, 11:
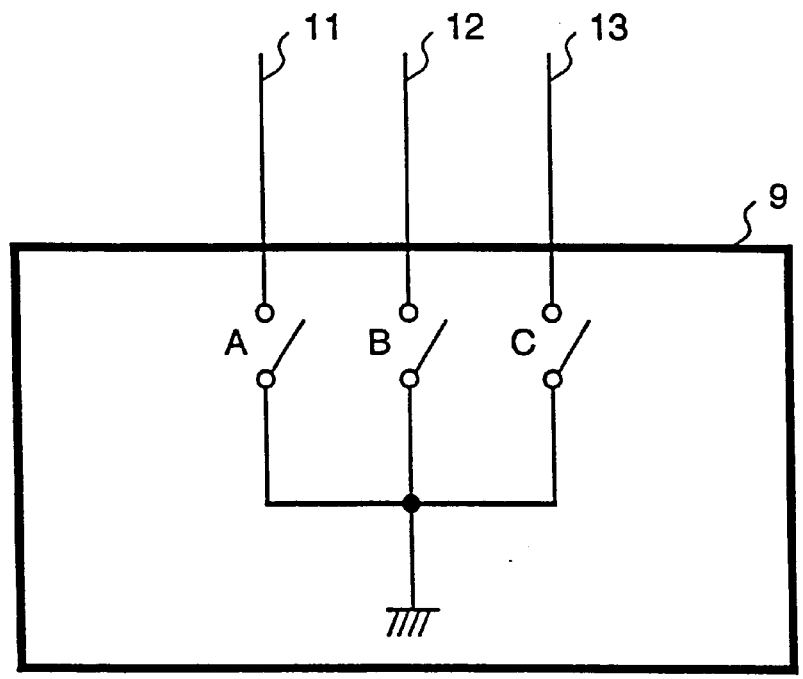
FIG. 10 is a description picture of the ignition switch used in the embodiment.
FIG. 11 is a description picture of the ignition switch used in the embodiment.

FIG. 10 shows an inner structure of the ignition switch 709. The individual signal lines 711 to 713 connected to the ignition switch are connected to the switches A, B and C connected to the body earth in the automobile. The signal line 711 is connected to the starter relay 703, and the electric power is supplied to the starter motor 704 when the switch A is turned ON. The signal lines 701 to 713 are connected to the electric power supply terminals 715 and 716, respectively, and are used as signal lines for reporting the position information of the ignition switch.

FIG. 11 is a truth table showing a relationship between the switch position of the ignition switch 109 described above and the ON-OFF status of the individual switches A B and C. For example, when the ignition switch is selected at the [RUN] position, the switch A is OFF, the switch B is ON and the switch C is ON.

Figure 12:
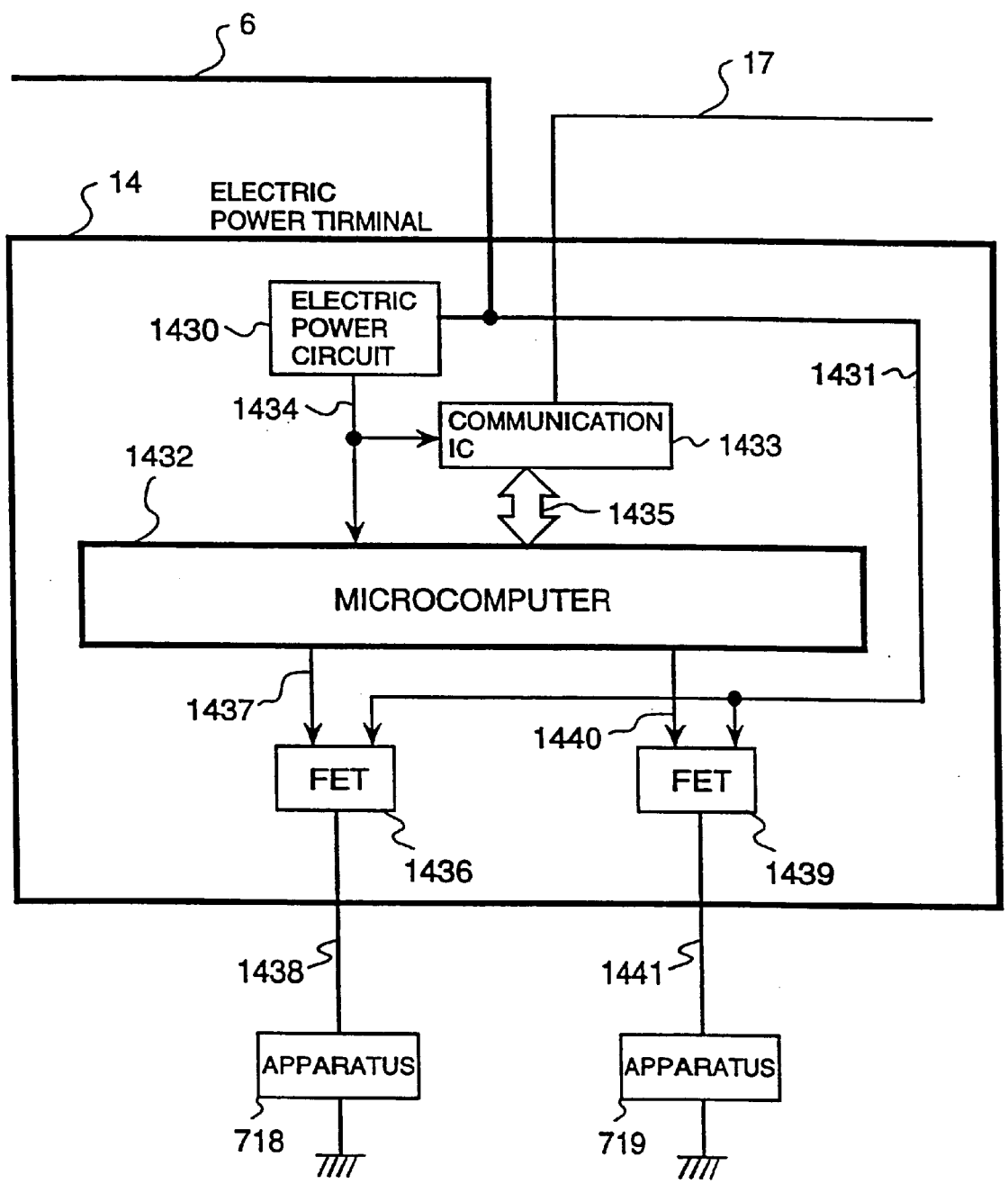
FIG. 12 is a block diagram showing one of the electric power terminals in the embodiment.

FIG. 12 shows an inner structure of the electric power supply terminal 714.

The electric power circuit is a constant voltage power supply for supplying the electric power to the inner circuits of the electric power supply terminal, to which the electric power is supplied through the electric power cable 706. This constant voltage power is supplied through the supply line 1434 to the communication IC 1433 and the microcomputer 1432. The data bus 1435 is used for exchanging the data used for communication with another electric power supply through the communication IC 1433.

The electric power line 1431 is connected to FET's 1235 and 1439, and used as an electric power supply for driving the electric load. FET stands for Field Effect Transistor, and is a kind of load drive devices. In the present invention, FET having a temperature detection function inside itself is used.

The temperature detection function is a function for protecting the damage of the device itself by shutting down the electric power supply to itself when the temperature of the inside chip of FET increases over 150° C. (in this embodiment). In the present invention, by means of using intentionally switching devices having such a self protection function equivalent to the fuse. With this circuit configuration, there is such an advantage that many fuses conventionally used in the automobile can be reduced.

FET's 1436 and 1439 are controlled for turning ON and OFF the devices by the microcomputer 1432 connected through the signal lines 1437 and 1440. When FET 1436 is turned ON, the electric power on the electric power line 1431 is supplied to the load apparatus 1418 through the load electric power line 1438. Similarly, when FET 1439 is turned ON, the electric power on the electric power line 1431 is supplied to the load apparatus 719 through the load electric power line 1441.

Figure 13:
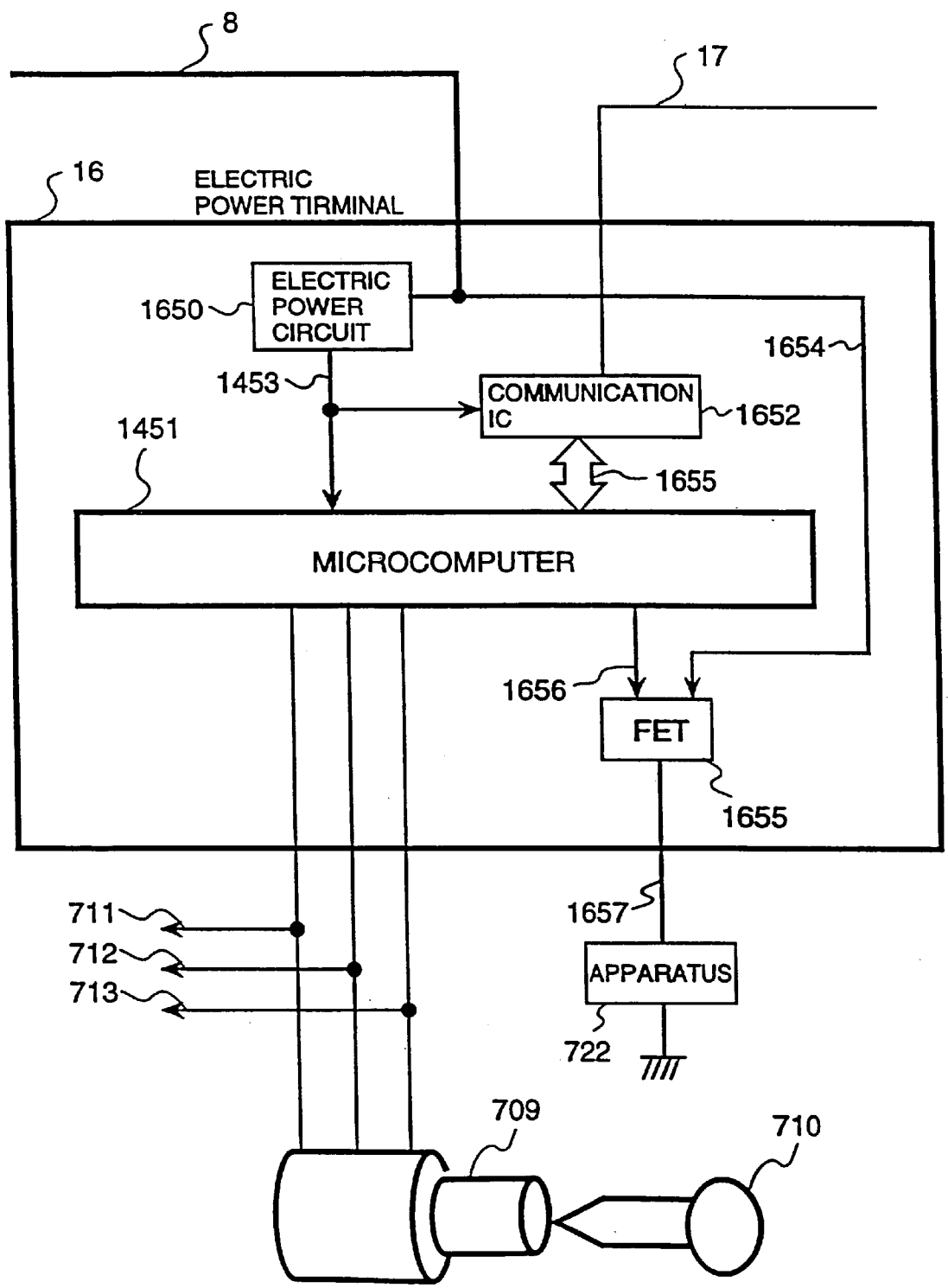
FIG. 13 is a block diagram of one of the electric power terminals to which the signal of the key switch is supplied.

FIG. 13 is an inner block diagram of the electric power supply terminal 716. The difference from the electric power supply terminal shown in FIG. 12 is that the electric power supply terminal 716 accepts the three signals 711, 712 and 713 from the ignition switch 709, but functions of another part of the terminal 716 are identical to those shown in FIG. 12, which will not be described again.

The microcomputer 1351 judges the position of the engine key of the ignition switch according to the captured information of the ignition switch 709, and reports the information through the communication IC 1352 to the all the electric power supply terminals connected to the system. The individual electric power supply terminals supply the electric power to the specified electric loads connected to the individual electric power supply terminals according to the reported information related to the operation of the ignition switch. With this control mechanism, the alternation, connection and interruption operations for the electric power supply which have ever been concentrated on the operation of the single ignition switch can be efficiently distributed to the individual electric power terminals, and hence, the electric power cable with its diameter being smaller can be replaced for the electric power line with its diameter being larger so durable for the large amount of electric current connected to the ignition switch. By means that the devices having a self protection function are used in the individual electric power supply terminal for the switching device for supplying the electric power, the number of fuses can be reduced. In addition, with two functions described above, the configuration of the electric power lines conventionally extended exhaustively in the automobile can be simplified, and therefore, the overall number of electric power lines installed in the automobile can be reduced at large.

It is allowed that the target devices to which the electric power terminals supply the electric power may include some control unit, motors or lamps. As there are many switches at the part where many electric power supply terminals and electric loads are concentrated, for example, it is allowed that the ON signal of the open switch of the driver's side powered window is captured and the powered window drive motor may be operated for opening the powered window by the electric power supplied from the electric power supply terminal mounted inside the driver's side door.

Figure 14:
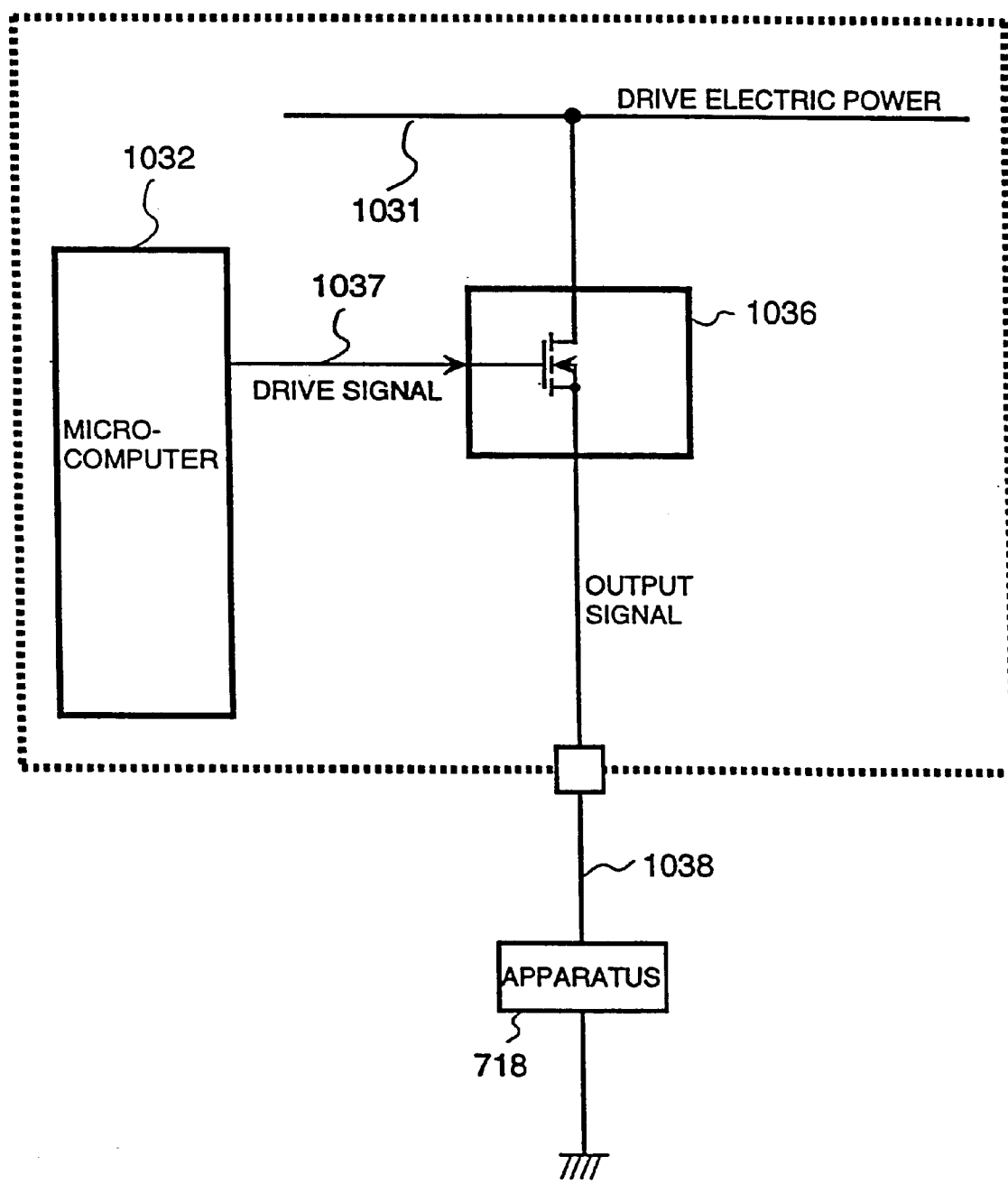
FIG. 14 is a block diagram of the electric power terminal.
Figure 15:
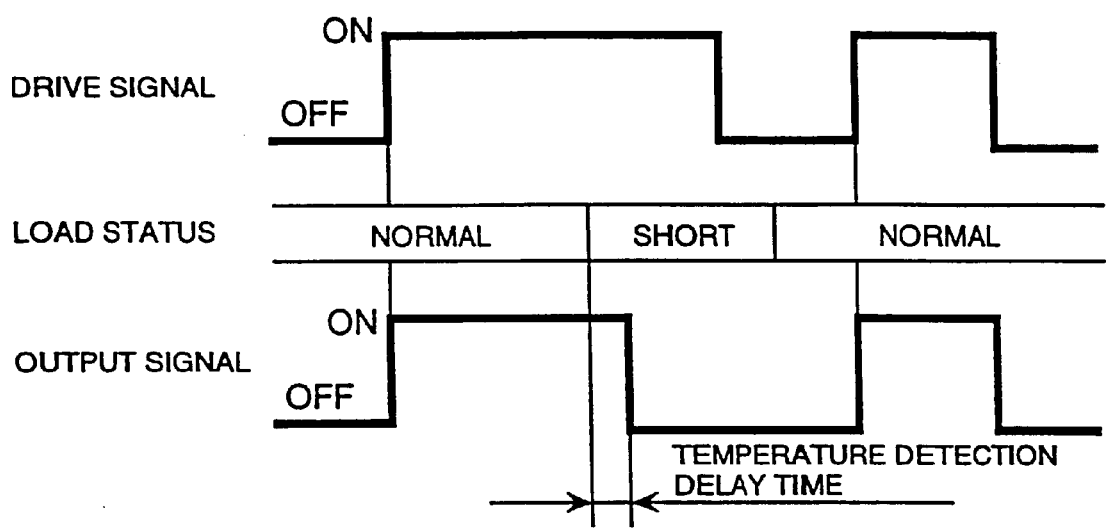
FIG. 15 is a timing chart showing the operation of the single-output switching device.

Now, the switching device supplying the electric power to the electric load is described below. FIG. 14 shows a part of the electric power supply terminal 1714. FET 1036 is a part for supplying the electric power on the electric power line 1031 in responsive to the drive signal 1037 from the microcomputer 1032 to the load apparatus 718. Referring to FIG. 15, what is described is the mechanism of driving the electric power supply terminal and the operation of the apparatus in the example when the load apparatus 718 makes short at the output signal line 1038.

FIG. 15 is a timing chart showing the status of the drive signal 1037, the load apparatus and the output signal. In general, the relationship between the drive signal to the load and the output signal is correlated to each other, in which, when the drive signal is [HI], the output signal is [HI] and the electric power is supplied to the load apparatus 718. In this correlated status, when the output signal makes short to the body earth, the output current increases and the chip temperature of FET increases. As described above, in this embodiment, as FET having a temperature detection function is used, FET automatically shuts down the output signal when the chip temperature becomes over 150. In FIG. 15, "Temperature Detection Delay Time" means the time lag from the detection of the temperature rise until FET shuts down itself automatically. In actual cases, this time is about few mili second, which is rather shorter than the time given by the conventional fuse-type protection mechanism. Therefore, as bimetal type temperature breaker for protecting the burning damage of amateur coil mounted in the powered window motor is not required any more, the overall cost reduction for the automobile can be enabled.

Now, referring to flowcharts, the operation of the apparatus in the present invention will be described.

Figure 16:
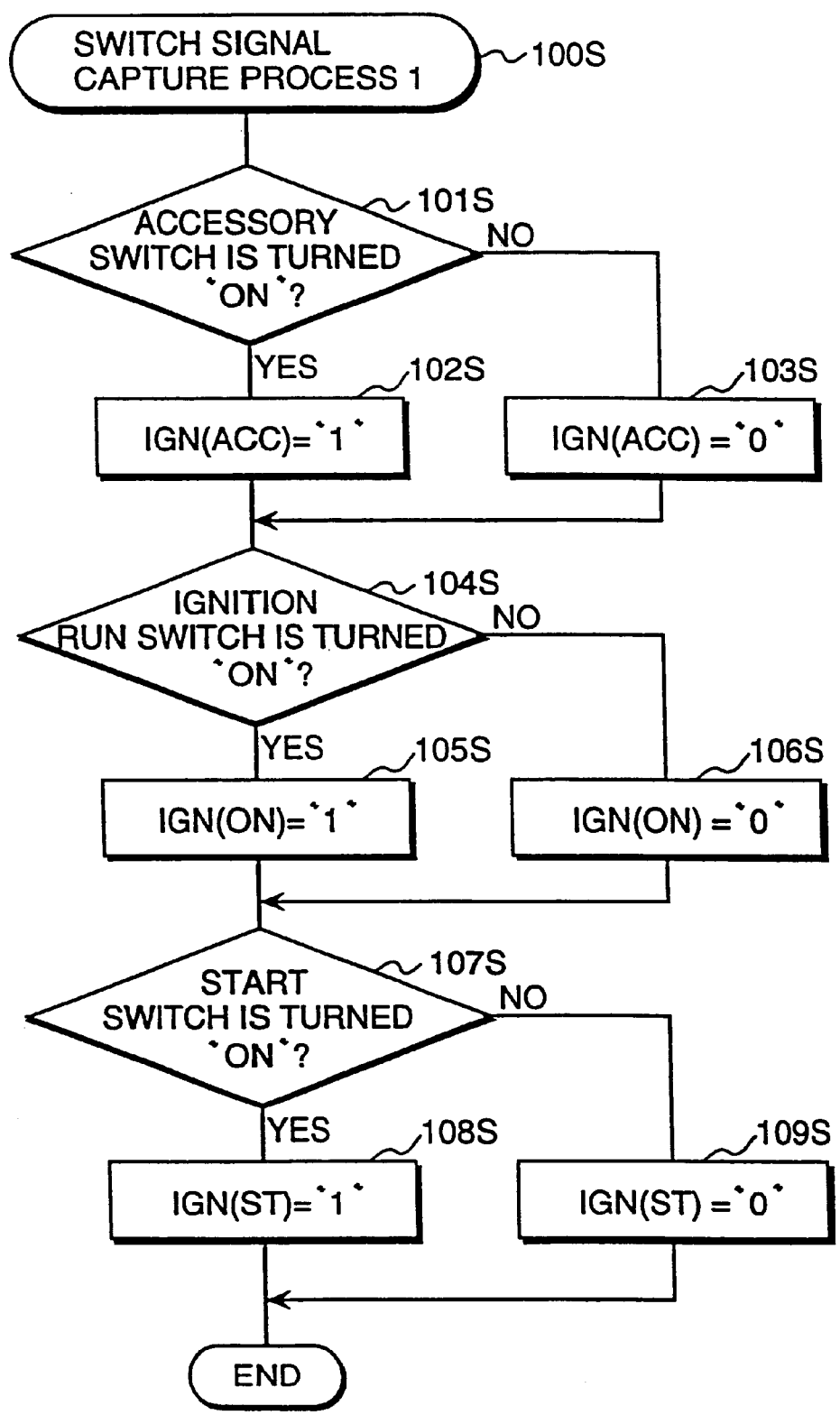
FIG. 16 is a flowchart showing the switch signal capturing procedure.

At first, referring to FIG. 16, the part for capturing the signal from the ignition switch 709 is described. The procedure defined in the flowchart is done in the scheduled interruption procedure executed by the microcomputer 1651 of the electric power supply terminal 715 in a repetitive manner in a definite time interval. The reason why the procedure is executed in a definite time interval is that the filter procedure for removing the effect brought by the chattering action of the switch can be easily performed. At first, Step 101S judges whether the accessory switch (Switch C in FIG. 10) is turned ON. If the accessory switch is turned ON, Step 102S is selected next, where the IGN(ACC) flag indicating that the accessory switch is turned ON is defined to be "1". In turn, if not so, the IGN(ACC) flag is cleared to be "0" in Step 103S.

Next, in Step 104S, what is judged is whether the ignition RUN switch (Switch B in FIG. 10) is turned ON or not. If the ignition RUN switch is judged to be turned ON, Step 105S is selected next and the flag IGN(ON) is set to be "1". If not so, the flag IGN(ON) is cleared to be "0" in Step 106S. Finally, in Step 107S, what is judged is whether the ignition START switch (Switch A in FIG. 10) is turned ON or not. If the ignition START switch is judged to be turned ON, Step 108S is selected next where the flag IGN(ON) is set to be "12". If not so, Step 109S is selected finally where the flag IGN(ON) is cleared to be "0".

It is important to operate the ignition switch with the engine key for driving the automobile. In the present invention, if the status signal of the ignition switch is mistaken or failed to be captured accidentally, the operation for the electric power supply may be out of control. In order to avoid such an erroneous case, the signal capture system for the ignition switch is configured in a duplex system. For this reason, the signal from the ignition switch is captured redundantly by the electric power supply terminals 715 and 716 in FIG. 7. Another purpose of this configuration is that the status signal of the ignition switch may not be lost even if the fuse of the electric power breaker 705 is melt down and broken, for example, due to the short-circuit accident in the electric power cable 8.

Therefore, the procedure identical to that shown in FIG. 16 is executed also in the microcomputer mounted in the electric power supply terminal 715.

Next, what is described is the procedure that the microcomputers of the individual electric power supply terminals transmit data through the communication IC's.

Figure 17:
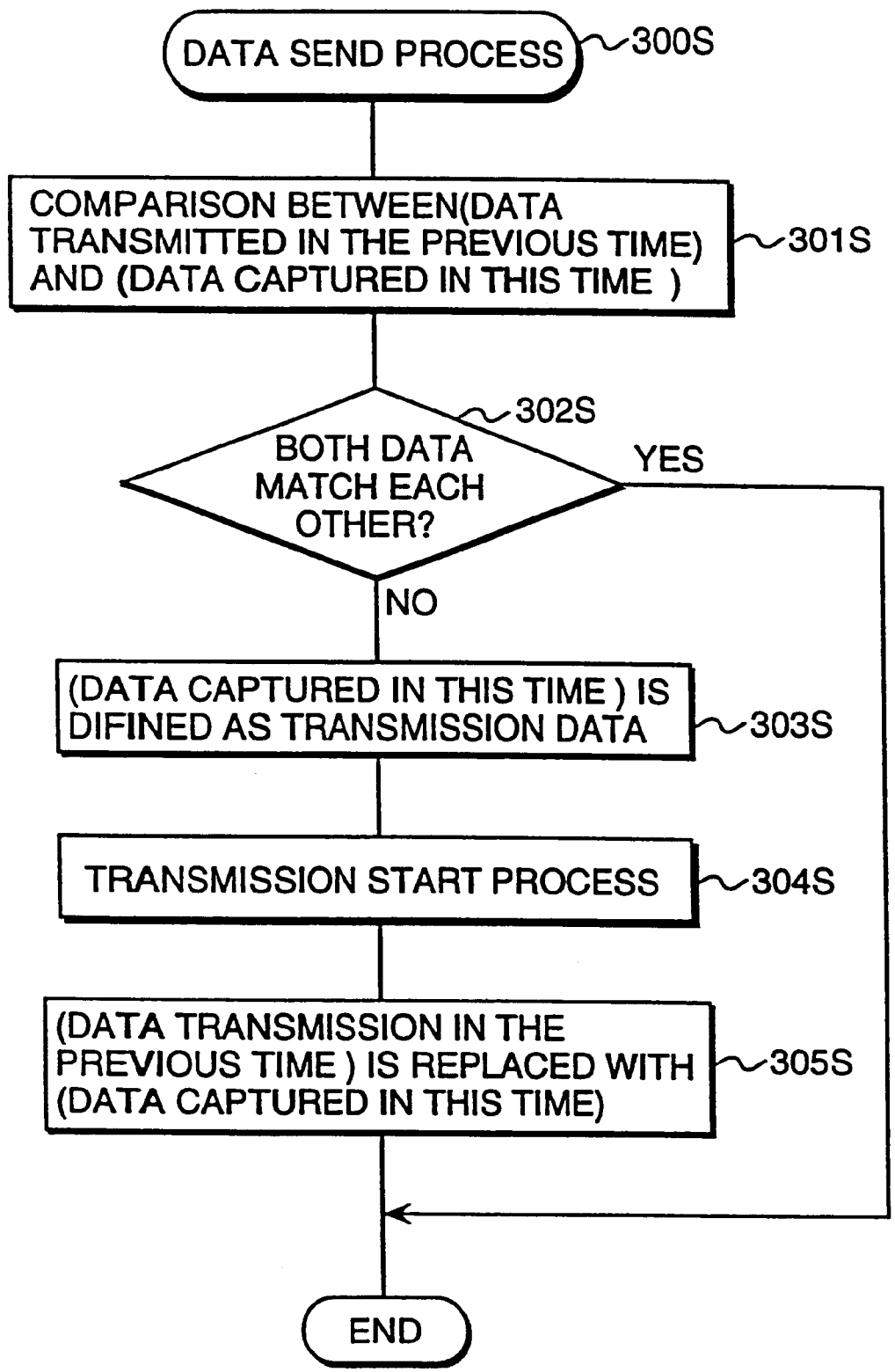
FIG. 17 is a flowchart showing the data transmission procedure.

FIG. 17 is a flowchart of the data transmission procedure 300S executed by the microprocessor. At first, in Step 301S, what is done is the comparison between the data transmitted in the previous time frame and the data captured in the scheduled interruption procedure described above. If Step 302S judges that both data sets are exact the same as each other (there is no change in the input signal to the switch), the procedure is terminated without transmitting the data. In case that there is any change in the input signal to the switch, Step 303S is selected and the data captured in the present time frame are set on the communication IC as the transmission data, and next, the data transmission request to the communication IC is issued in Step 304S. And finally, in Step 305S, the captured data (data transmitted) are stored as the data transmitted in the previous time frame, and the procedure is terminated.

Figure 18:
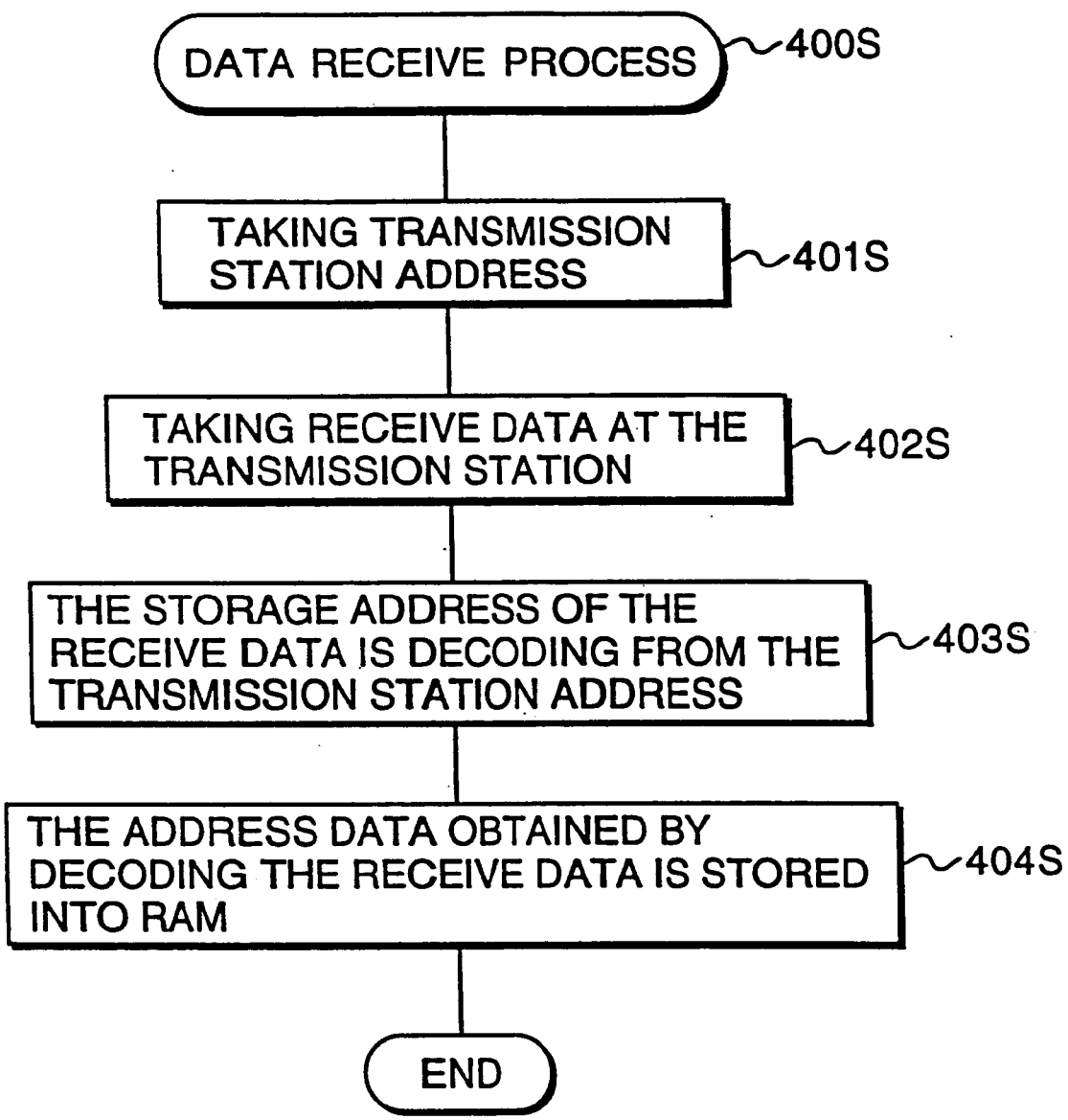
FIG. 18 is a flowchart showing the data receive procedure.

Next, the data receive procedure will be described. Basically, the communication IC has a function of reporting the fact that the communication IC receives the data when the communication IC receives the data. Therefore, in this embodiment, the interruption procedure is invoked in responsive to this reporting signal from the communication IC, and the data received by the communication IC are collected. This procedure is done in the data receive procedure 400S with its flowchart shown in FIG. 18.

In Step 401S, the address of the transmission station is obtained in order to judge the station from which the received data are transmitted. Next, in Step 402S, the received data are collected. Next, in Step 403S, the address of RAM in which the received data are to be stored is obtained by decoding the address of the transmission station obtained in Step 401S. Finally, in Step 404S, the received data are stored in the designated address in RAM. Thus, by means of preserving the definite area on RAM to be used for storing the data specific to the individual transmission station, the data commonly necessary for various procedure can be obtained by accessing the designated address on RAM.

Figure 19:
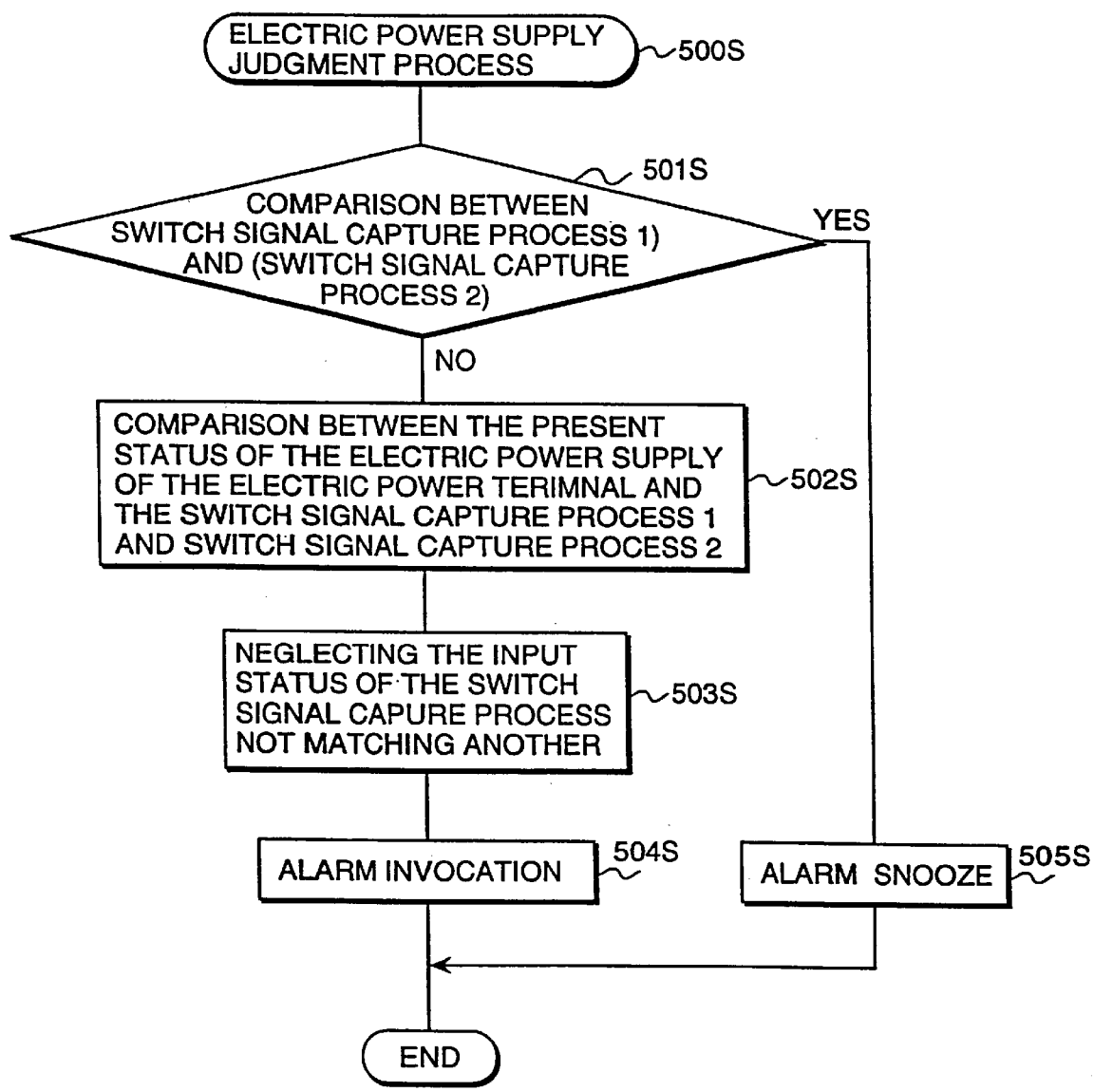
FIG. 19 is a flowchart showing the electric power supply judgment procedure.

FIG. 19 id s flowchart of the abnormality judgment logic in the two ignition switch signal capture procedure described above (according to the electric power supply terminals 715 and 716). In Step 501S, the information captured by the switch signal capture procedure (shown in FIG. 16) executed by the electric power supply terminal 716 and the information captured by the switch signal capture procedure executed by the electric power supply terminal 716 are compared. If both data sets are judged to be identical, Step 505S is selected finally where the alarm message generation is interrupted, and the procedure is terminated. As for the alarm message generation, many alternatives for allowing the driver to recognize the existence of the abnormal status in the automobile can be used.

If Step 501S determines that both data sets do not match each other, Step 502S is selected next, and further comparison between the status of the electric power supply having been put out ever and the status of the output signals of two ignition switches are compared. In Step 503S, the status of the input signal of the switch signal capture procedure which does not match another is neglected and the alarm message reporting the occurrence of the abnormality is generated in Step 504S.

As describe above, by judging the abnormality status from the status of the electric power supply operation having been put out ever, the error-free and reliable request for supplying the electric power can be established, and hence, the erroneous operation of the apparatus due to the mistaken capture of the output signal from the ignition switch can be prevented.

Figure 20:
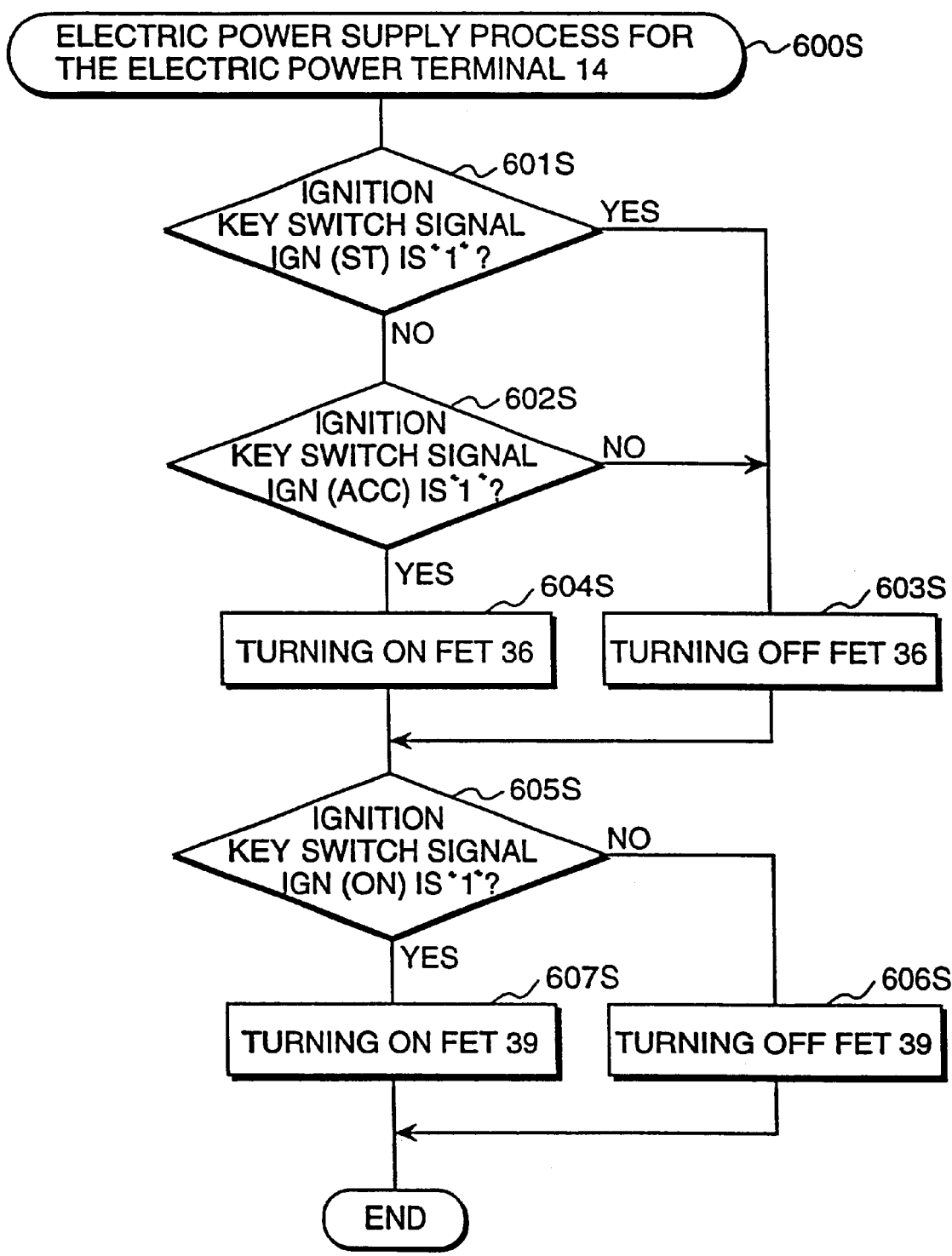
FIG. 20 is a flowchart showing the electric power supply procedure of the electric power terminal 714.

Next, by referring to FIG. 20 showing the electric power supply procedure 600S of the electric power supply terminal 1714, the electric power supply procedure by the electric power supply terminal from the information obtained as described above is described.

At first, in Step 601S, the flag IGN{ST} is checked for judging whether the ignition switch is at [START] position or not. This flag is the data set by the procedure shown in FIG. 10.

If the ignition switch is positioned at the starter position, that is, the engine is tried to be stated, Step 603S is selected next for turning OFF FET 1436. This procedure is aimed to reduce the unnecessary electric power consumption used for starting the engine.

If Step 601S judges that the ignition switch is not positioned at [START] position, Step 602S is selected next, and what is checked is whether the accessory power switch of the ignition switch is turned On or not by referring to the flag IGN(ACC). If the flag IGN(ACC) is "1", Step 604S is selected next where the drive signal 1437 is switched to be HIGH in order to turn ON FET 1436. If the flag IGN(ACC) is "0", Step 603S is selected next and the drive signal 1437 is switched to be LOW. Therefore, FET 1436 is proved to work as a switching device for supplying the electric power to the load apparatus 718 to which the electric power is supplied when the ignition switch is located at the accessory position.

Next, in Step 605S, the flag IGN(ON) is examined for judging whether the ignition switch is turned ON or not. This flag is also the data set by the procedure shown in FIG. 10 similarly to the flag IGN(ACC). If the flag IGN(ON) is "1", Step 607S is selected next where the drive signal 1440 is switched to be HIGH in order to turn ON FET1439. If the flag IGN(ON) is "0", Step 606S is selected next and the drive signal 1440 is switched to be LOW and the procedure is terminated. Therefore, FET 1439 is proved to work as a switching device for supplying the electric power to the load apparatus 719 to which the electric power is supplied when the ignition switch is located at the ON position.

As described above, the electric power breaker for interrupting the electric power supply is so located on the midpoint of the electric power line extended from the battery power supply, and the electric power line is further extended from the electric power breaker. And furthermore, the electric power supply terminal is made to be located on the midpoint of the electric power line, from which the electric power is distributed to the individual electric loads. By means that the distribution of the electric power and the control of the electric power supply to the electric loads are performed by the multiplex communication, the electric power lines conventionally concentrated near the ignition switch can be slimed, and the fuse function can be provided to the switching device by using a device having a self protection function as the switching device for supplying the electric power, which enables the elimination of fuses which leads to such an advantage that the system can be established with the reduced number of the power cables for supplying the electric power as well as the signal cables can be reduced.

What is claimed is:

1. A semiconductor switching element used in an electric power supplying apparatus for a vehicle, wherein said semiconductor switching element is located adjacent a control circuit for supplying a control signal to said semiconductor switching element; and said semiconductor switching element functions such that when at least one of a control apparatus receiving electric power supply from said semiconductor switching element and an output line between the semiconductor switching element and the control apparatus is shorted, said semiconductor switching element senses its own temperature increase based on a short current flowing through it to cause it to shut down.

2. A semiconductor switching element according to claim 1, wherein said semiconductor switching element is an PET.

* * * * *